United States Patent [19]

Sovoda

[11] Patent Number: 5,711,569
[45] Date of Patent: Jan. 27, 1998

[54] TAILGATE HAVING A CARRYING HANDLE

[75] Inventor: Brent R. Sovoda, Dearborn, Mich.

[73] Assignee: Ford Motor Company, Dearborn, Mich.

[21] Appl. No.: 566,625

[22] Filed: Dec. 4, 1995

[51] Int. Cl.$^6$ ............................ B62D 33/03; B62D 33/033
[52] U.S. Cl. ................................................ 296/57.1
[58] Field of Search ........................... 296/57.1; 49/463

[56] References Cited

U.S. PATENT DOCUMENTS

| | | |
|---|---|---|
| 3,387,406 | 6/1968 | Coker et al. |
| 3,656,801 | 4/1972 | Doutt et al. |
| 3,734,560 | 5/1973 | Cramblet. |
| 3,848,918 | 11/1974 | Dyer. |
| 4,278,284 | 7/1981 | Ohlson. |
| 5,004,287 | 4/1991 | Doyle. |
| 5,320,397 | 6/1994 | Peterson et al. ............... 396/57.1 |
| 5,358,301 | 10/1994 | Konchan et al. |

Primary Examiner—Gary C. Hoge
Attorney, Agent, or Firm—Schwartz & Weinrieb

[57] ABSTRACT

A removable tailgate assembly (18, 118), mounted upon a pick-up type truck vehicle (10), is provided with a handle (46, 146) within the vicinity of the lower end portion (20, 120) of the tailgate assembly (18, 118) along the centerline (48) of the tailgate assembly (18, 118) as viewed in the transverse direction extending between opposite sides of the tailgate assembly (18, 118). The handle may comprise a recessed region (60) formed at the corner junction of the inner (52) and bottom panel (56) members of the tailgate assembly (18), or an insert (166) mounted within an aperture (164) formed at the corner junction of the inner (152) and bottom (156) panel members of the tailgate assembly (118) wherein the insert (166) defines a hollow portion (168) for accommodating the fingers (170) of the person removing the tailgate assembly (118) from the vehicle (10) and carrying the same toward a storage facility. The recessed region (60) and the insert (166) have limited width dimensions so as to accommodate, yet comfortably confine, four fingers of the person's hand so as to assist the person (50) in carrying or transporting the tailgate assembly (18, 118) in a balanced manner.

20 Claims, 4 Drawing Sheets

TAILGATE HAVING A CARRYING HANDLE

BACKGROUND OF THE INVENTION

1. Field of the Invention

The present invention relates generally to tailgate assemblies which are removably mounted upon, for example, vehicle truck bodies, and more particularly to a removable vehicle tailgate which has a recessed handle integrally incorporated within or formed upon an inner panel surface of the tailgate so as to facilitate carrying of the tailgate in an easily balanced manner by means of a single person once the tailgate has been removed from the vehicle truck body.

2. Disclosure Information

It is of course well known to provide a vehicle truck body, of the "pick-up" truck type, with a tailgate which is pivotally mounted upon the truck body so as to be movable about a hinge or pivot axis between, for example, an open horizontal position and a closed vertical position. It is also conventional to provide the tailgate with straps which are detachably connected to the vehicle truck body so as to support the tailgate when the latter is disposed in the aforenoted open horizontal position. It is still further conventional and well-known to provide the tailgate and the truck body with suitable mounting structure which enables the tailgate to be removed from the truck body when, for example, the tailgate is pivoted to a predetermined angular position with respect to the truck body. More particularly, one side of the truck body, and the corresponding side of the tailgate, are provided with cooperating shaft and trunnion structure, while the opposite side of the truck body, and the corresponding side of the tailgate, are provided with cooperating pin and trunnion structure wherein such trunnion structure includes a radial slot through which the pin is passed when the tailgate is mounted upon or removed from the vehicle truck body.

While conventional tailgate assemblies have therefore been provided with suitable structure which readily enables the tailgate to be removed from the vehicle truck body, difficulty subsequently arises in connection with the handling or transportation of the removed tailgate to, for example, a storage location by means of a single person. The tailgate embodies a substantial amount of weight, it is generally large and bulky, and is not readily provided with any structure which enables the tailgate to be readily balanced while being carried by means of a single person.

A need therefore exists in the art for the development or fabrication of a vehicle tailgate which is readily removable from the vehicle truck body and once so removed from the truck body can be readily and easily transported in a balanced mode by means of a single person.

OBJECT OF THE INVENTION

Accordingly, it is an object of the present invention to provide a new and improved vehicle tailgate assembly which is removably mounted upon a vehicle truck body, and wherein the tailgate is provided with a recessed handle which is integrally incorporated within or formed upon an inner panel surface of the tailgate so as to facilitate the carrying or transport of the tailgate in an easily balanced manner by means of a single person once the tailgate has been removed from the vehicle truck body.

SUMMARY OF THE INVENTION

The foregoing and other objects are achieved in accordance with the present invention through the provision of a new and improved tailgate assembly which is pivotably mounted upon a vehicle truck body so as to be movable about a pivot or hinge axis between an open horizontal position and a closed vertical position. The structure defined between the truck body and the tailgate assembly so as to define the pivot or hinge mechanism for the tailgate and thereby permit its pivotable movement with respect to the truck body also permits the tailgate to be removed from the truck body. More particularly, the pivot or hinge structure comprises a stub shaft fixedly mounted upon one side of the truck at the rear end of a first truck side panel, and a cooperating trunnion formed upon a corresponding side of the tailgate for rotatable cooperation with the truck body stub shaft. The other side of the truck is similarly provided with a pin mechanism which is fixedly mounted upon the other side of the truck at the rear end of a second or opposite truck side panel and which is coaxially aligned with the stub shaft mounted upon the first side of the truck such that the pin and stub shaft together define the horizontally disposed pivot or hinge axis for the tailgate. A second trunnion is provided upon the opposite side of the tailgate and includes a radial slot through which the pin mechanism of the truck body can pass when the tailgate is disposed at a predetermined angle with respect to the truck body so as to in fact permit the tailgate to be mounted upon or removed from the truck body.

In accordance with the specific principles and teachings of the present invention, in order to facilitate the handling or transportation of the tailgate assembly, such as, for example, toward or from a storage facility when a removed tailgate assembly is to be stored or when a previously stored tailgate assembly is to be re-mounted upon a truck body, a recessed handle is defined or formed within the bottom, horizontally extending side of the tailgate assembly. The recessed handle is provided at a central region of the bottom, horizontally extending side of the tailgate assembly, as considered in the crosswise or transverse direction extending parallel to the vehicle truck tailgate hinge or pivot axis, and is also provided at substantially the planar junctions of the vertically extending inside panel of the tailgate and the horizontally extending bottom panel of the tailgate, such relative directions or orientations being understood to mean those conventionally associated with the tailgate assembly when the same is disposed in its normal, vertical orientation when mounted upon the truck body and disposed at its vertical, closed position. The recessed handle also has a predetermined length extending in the noted crosswise or transverse direction such that the recessed handle effectively defines a socket within which a person's fingers can be comfortably inserted while, in addition, the person's fingers and hand can properly grasp and balance the tailgate assembly during the handling, transporting, or carrying of the same.

DETAILED DESCRIPTION OF THE ILLUSTRATED EMBODIMENTS

Figure 5:
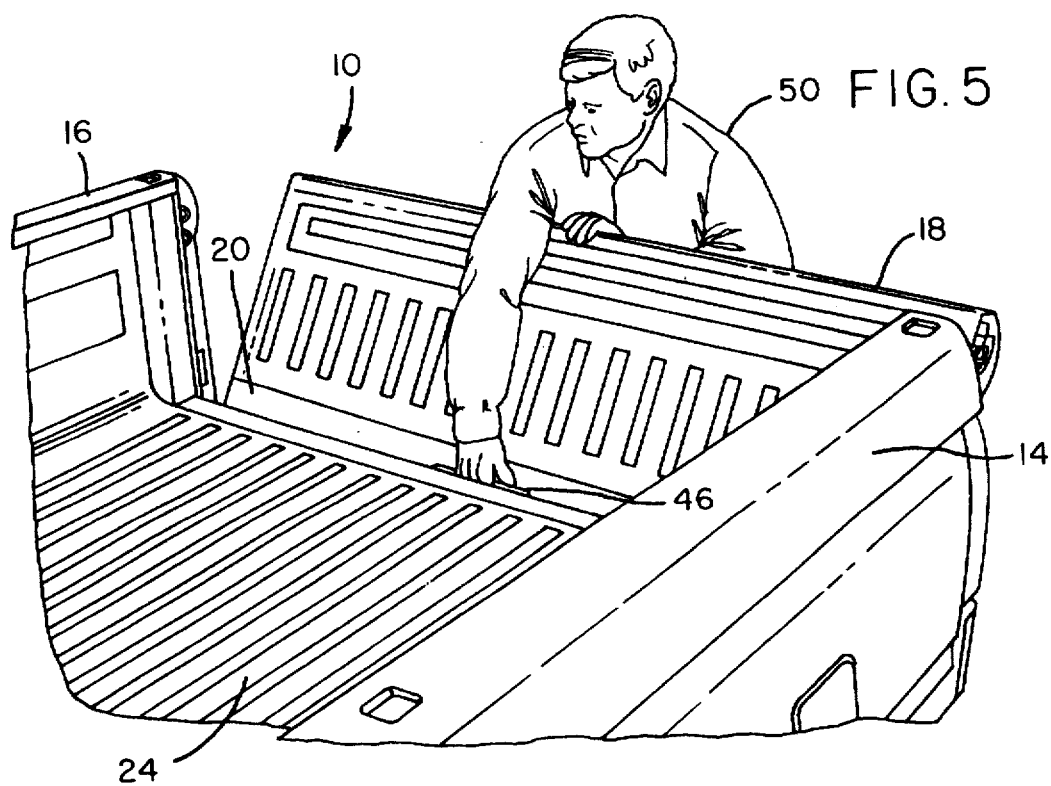
FIG. 5 is a front perspective view of the rear end portion of the truck and similar to that of FIG. 4, showing, however, the person grasping the tailgate assembly by means of the recessed handle incorporated within the lower central portion of the tailgate assembly in preparation for actually removing the tailgate assembly from the truck body.
Figure 6:
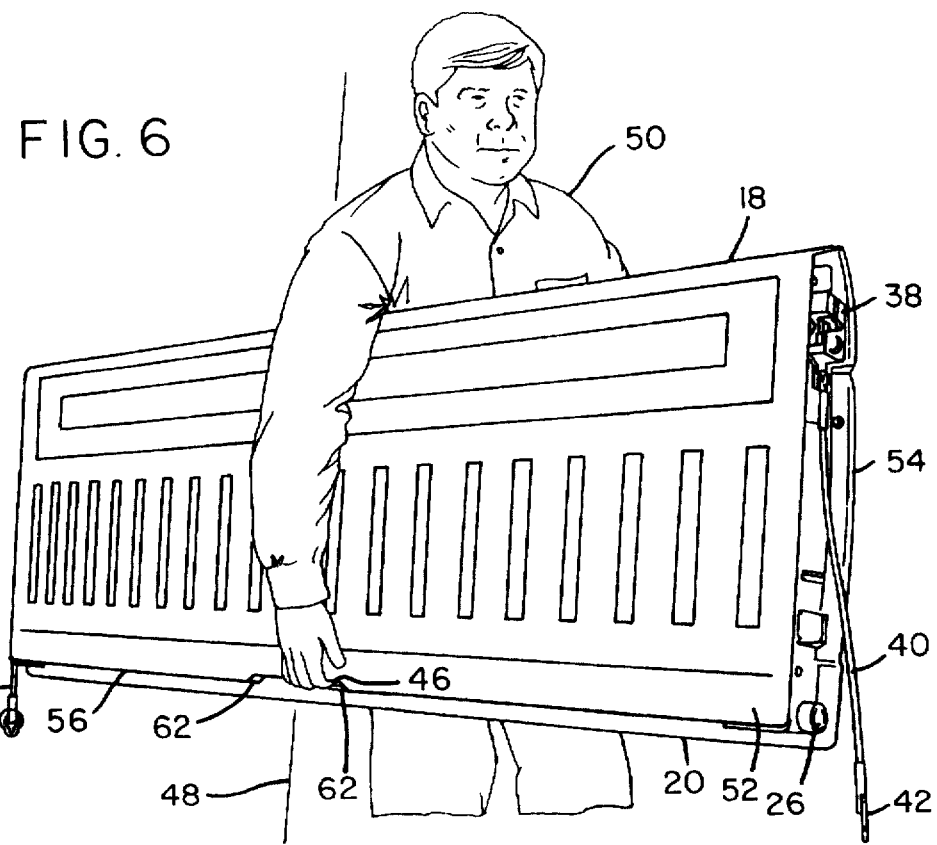
FIG. 6 is a perspective view of the person of FIG. 5 carrying the tailgate assembly of FIG. 5 in a balanced mode after the tailgate assembly was removed from the truck body illustrated in FIG. 5.

Referring now to the drawings, and more particularly to FIGS. 1–4, 7, and 8, a truck vehicle, such as, for example, a pick-up type truck, is illustrated and generally indicated by the reference character 10. The truck conventionally comprises a passenger cab portion 12, left and right side panels 14 and 16, respectively, and a tailgate 18. As can be appreciated from FIGS. 3–5, the tailgate 18 is conventionally pivotally attached to the left and right side panels 14 and 16 of the vehicle 10 about its lower end portion 20, as illustrated in FIG. 6, and is also removable from the vehicle 10 as is also illustrated in FIG. 6.

Figure 7:
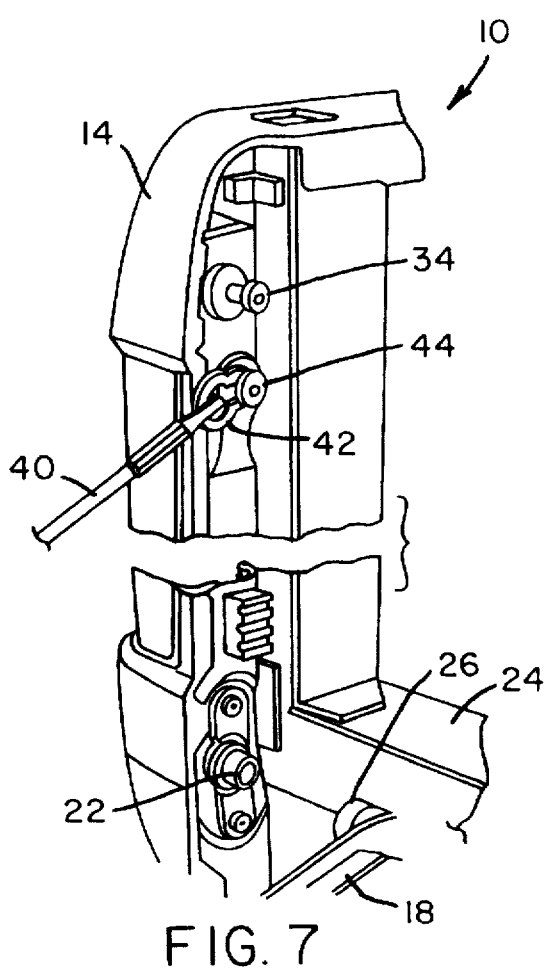
FIG. 7 is a rear perspective view of the left rear end portion of the pick-up truck shown in FIG. 1 showing the hinge mounting structure and one of the side support straps of the tailgate assembly with the tailgate assembly being disengaged from the truck body at the pivot structure thereof.
Figure 8:
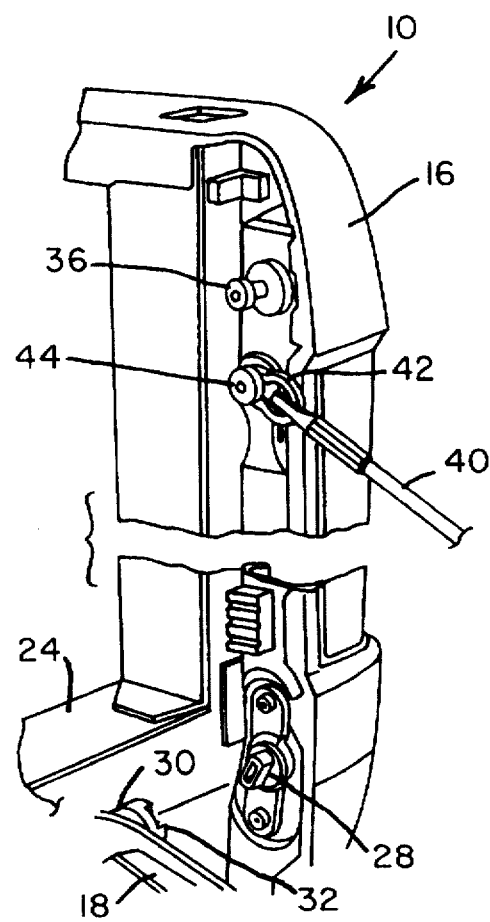
FIG. 8 is a rear perspective view of the right rear end portion of the pick-up truck shown in FIG. 1 showing the hinge mounting structure and the other one of the side support straps of the tailgate assembly with the tailgate assembly being disengaged from the truck body at the pivot structure thereof.

More particularly, and with additional reference being made to FIGS. 7 and 8, the left side panel 14 of the vehicle 10 is provided with a stub shaft 22 which is provided upon the left side panel 14 of the vehicle 10 so as to be disposed at a vertical height which essentially corresponds to the level of the truck bed 24. The left side of the tailgate 18 is correspondingly provided with a trunnion 26 which is adapted to be rotatably disposed about or over the stub shaft 22. In a similar manner, the right side panel 16 of the vehicle 10 is provided with a pin mechanism 28 which is likewise disposed upon the right side panel 16 of the vehicle 10 so as to be at a vertical height which essentially corresponds to the level of the truck bed 24. In addition, the vertical height disposition of the pin mechanism 28 also corresponds to that of the stub shaft 22 such that the stub shaft 22 and the pin mechanism 28 together define a horizontal axis about which the tailgate 18 is pivotable with respect to the vehicle side panels 14 and 16 and the vehicle bed 24. The right side of the tailgate 18 is further provided with a trunnion 30 for complementary engagement with the pin mechanism 28. The pin mechanism 28 has a substantially rectangular cross-sectional configuration, and the trunnion 30 is provided with a radial slot 32 into which the pin mechanism 28 is adapted to be inserted. Once inserted, the tailgate 18 may be pivoted relative to the side panels 14 and 16 of the vehicle 10 such that the tailgate 18 is effectively pivotally secured to the vehicle 10 as a result of the pin mechanism 28 and the slotted trunnion 30 effectively defining a bayonet type connection with respect to each other. The slot 32 is adapted to be angularly aligned with respect to the pin mechanism 28 when the tailgate 18 is pivoted to an angle of approximately 45° with respect to the vertical side panels 14 and 16 of the truck vehicle 10 so as to permit disengagement of the trunnion 30 from the pin mechanism 28 and thereby, in turn, permit removal of the tailgate 18 from the truck vehicle 10.

Figure 1:
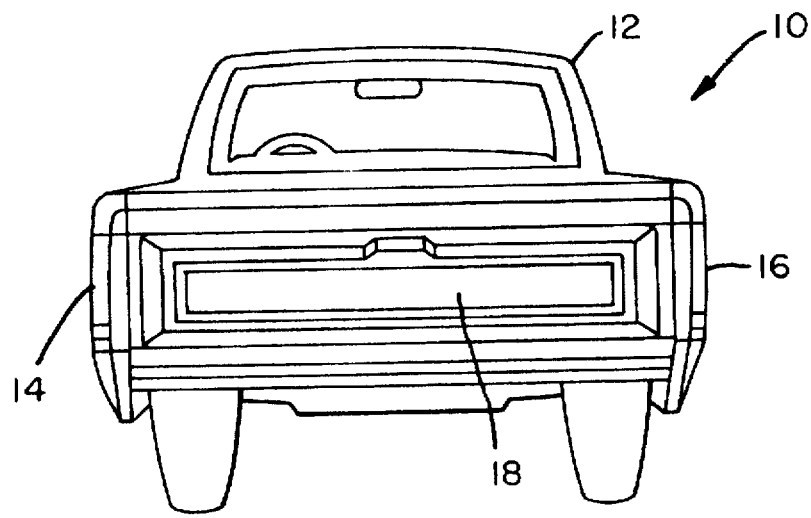
FIG. 1 is a rear elevation view of a pick-up truck with the tailgate assembly thereof disposed in its closed, vertical position.
Figure 2:
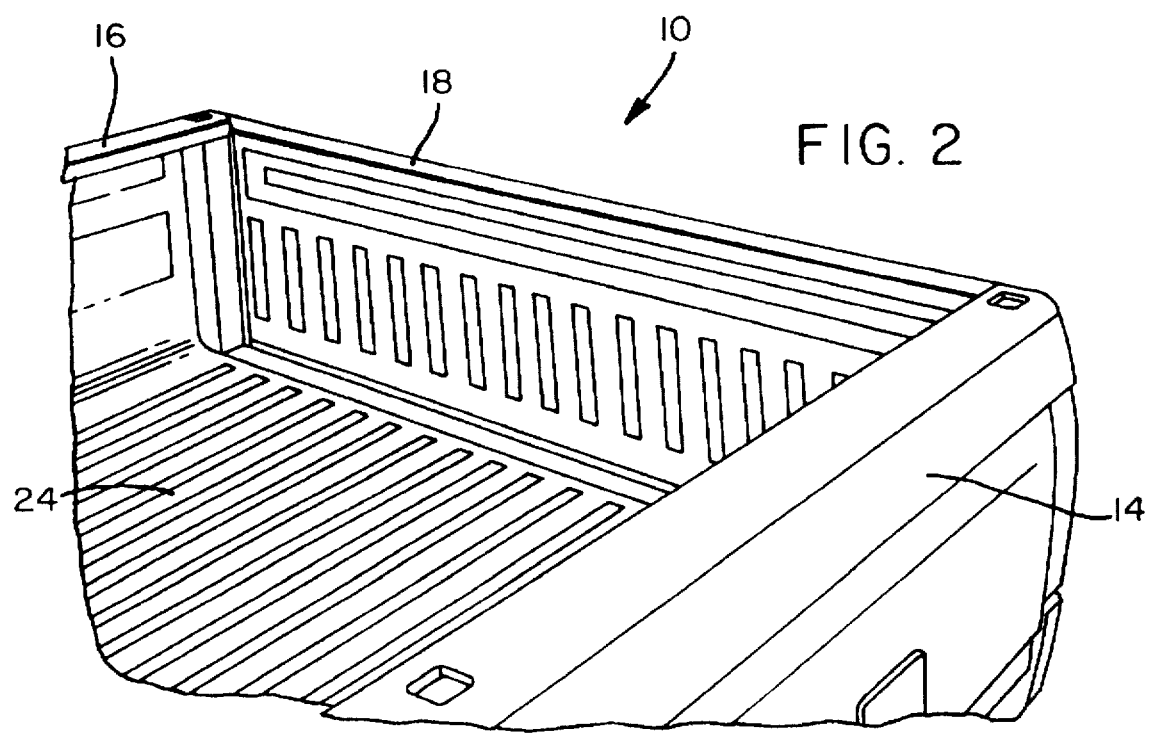
FIG. 2 is a front perspective view of the rear end portion of the truck shown in FIG. 1 showing the tailgate assembly disposed in its closed, vertical position.
Figure 3:
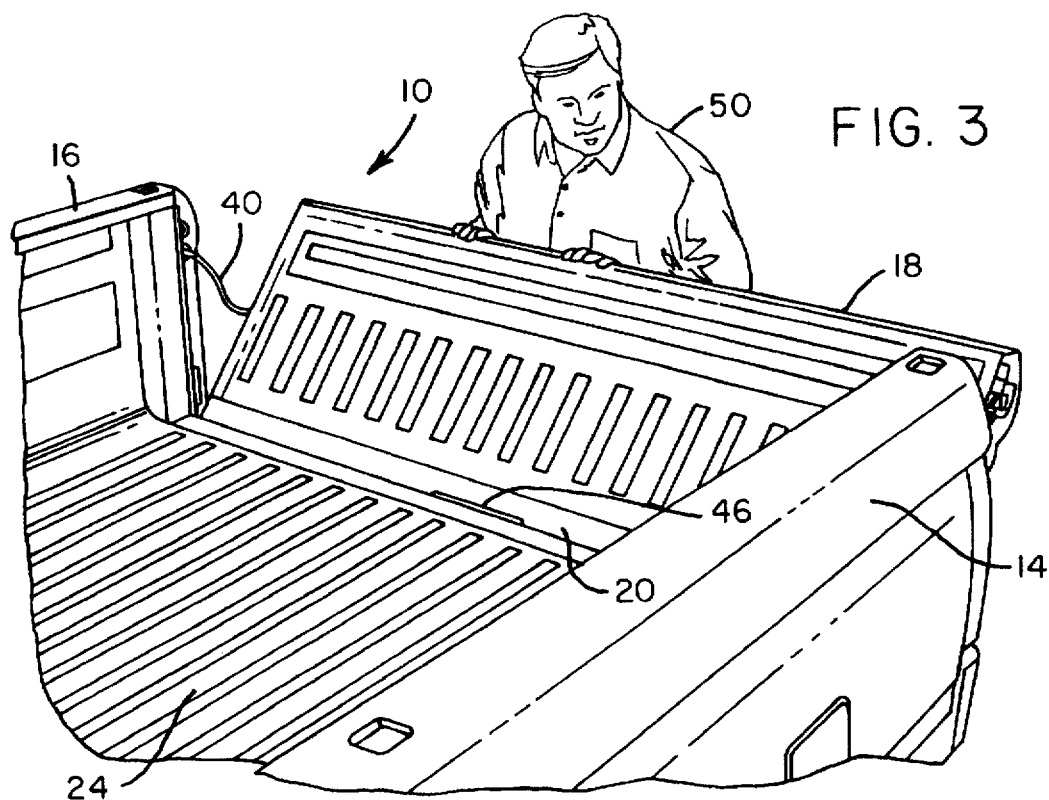
FIG. 3 is a front perspective view of the rear end portion of the truck and similar to that of FIG. 2, showing, however, a person beginning to pivot the tailgate assembly downwardly from its closed, vertical position toward its open, horizontal position in preparation for removal of the tailgate assembly from the truck body.
Figure 4:
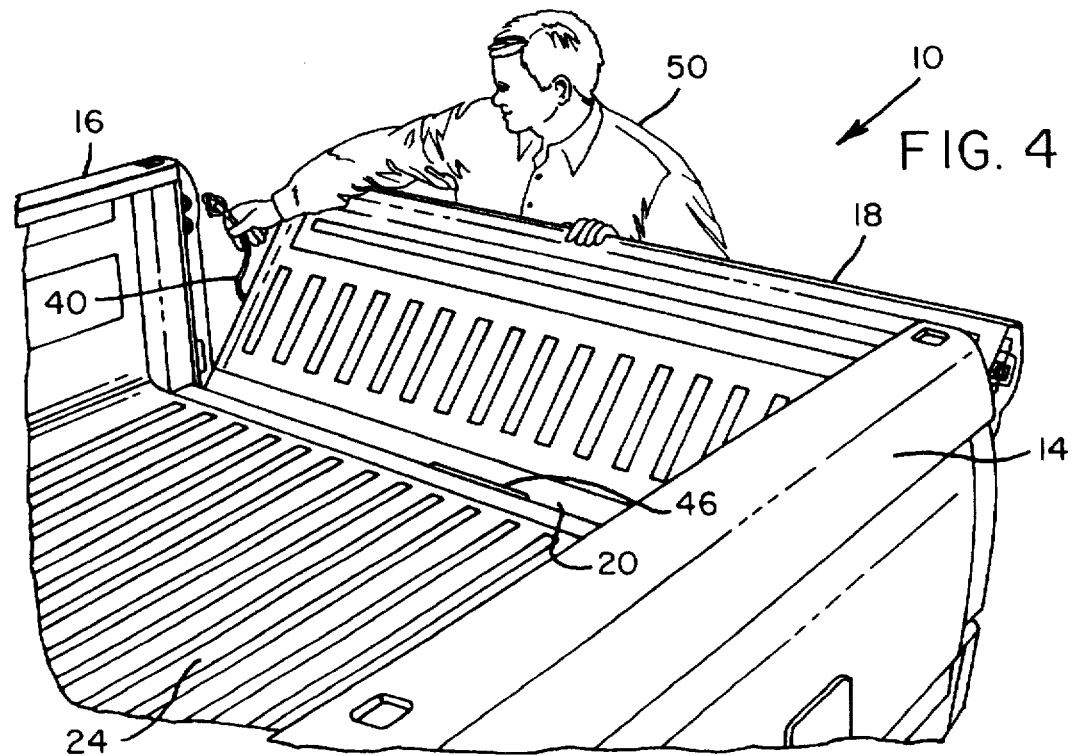
FIG. 4 is a front perspective view of the rear end portion of the truck and similar to that of FIG. 3, showing, however, the person disengaging the support straps conventionally removably connected between the tailgate assembly and the truck body so as to support the tailgate assembly in its lowered, horizontal, open position with respect to the truck body.

When the tailgate 18 is to be installed upon the vehicle 10, the trunnion 26 is first axially aligned with the stub shaft 22 and then moved axially toward the stub shaft 22 so as to surroundingly encompass the same. The right side of the tailgate 18 is then maneuvered such that the radial slot 32 of the trunnion 30 is aligned with the pin mechanism 28, and subsequently, the tailgate 18 is maneuvered further such that the pin mechanism 28 is effectively inserted into the radial slot 32 of the trunnion 30. The tailgate 18 may then be pivoted upwardly toward its vertical closed position with respect to vehicle 10 as illustrated in FIG. 1. In order to secure or lock the tailgate 18 in its vertical closed position, the upper regions of the left and right side panels 14 and 16 of the vehicle 10 are provided with conventional striker mechanisms 34 and 36, respectively, which are substantially vertically aligned with the stub shaft 22 and the pin mechanism 28, respectively. A suitable conventional latch mechanism 38, as best illustrated in FIG. 6, is correspondingly provided upon opposite sides of the tailgate 18, only one of which is illustrated, for latching engagement with the striker mechanisms 34 and 36. As is also conventional, the tailgate 18 is further provided with a pair of flexible straps 40 which are fixedly secured at first end portions thereof to opposite sides of the tailgate 18 within the vicinity of the latch mechanisms 38 as best illustrated in FIG. 6. The other end of each strap 40 is provided with a suitable ring-type fastener 42 which is adapted to releasably engage suitable pin fasteners 44 fixedly mounted upon the oppositely disposed side panels 14 and 16 at elevational levels just below the striker mechanisms 34 and 36. When the straps 40 have their ring-type fasteners 42 engaged with the pin fasteners 44, as illustrated in FIGS. 7 and 8, and the tailgate 18 is pivotally lowered to its horizontal open position, the straps 40 maintain the tailgate 18 at its horizontal open position. When the ring-type fasteners 42 are disengaged from the pin fasteners 44, the tailgate 18 may be removed from the vehicle as illustrated in FIG. 6.

Figure 9:
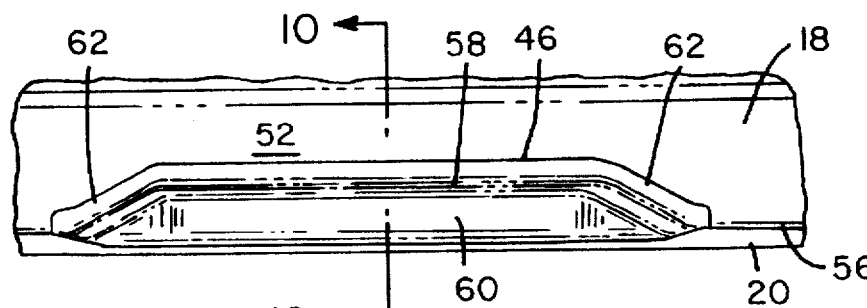
FIG. 9 is a partial side elevation view of the inside vertical panel of the tailgate assembly showing in particular the structure of a first embodiment of a recessed handle formed or incorporated within the tailgate assembly in accordance with the principles of the present invention.
Figure 10:
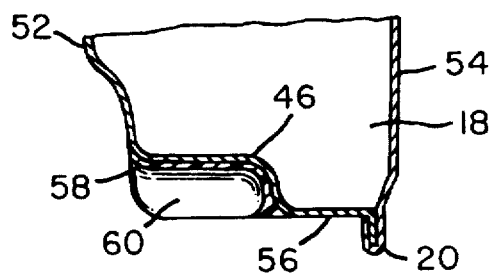
FIG. 10 is a cross-sectional view of the tailgate assembly of FIG. 9 as taken along the line 10—10 in FIG. 9.

As has been noted hereinbefore, when tailgates have been conventionally removed from pick-up type truck vehicles, difficulty has often been encountered in connection with the handling, transportation, or carrying of the tailgates to and from, for example, a storage facility, particularly by means of a single person. This difficulty is obviously due to a multitude of factors, such as, for example, the weight of the tailgate, the size of the typical tailgate which renders such cumbersome, bulky, and unwieldy, and the absence of any means which enables, for example, a single person to comfortably carry the tailgate in a balanced manner. In accordance with the principles of the present invention, the tailgate assembly 18 is provided with a recessed handle structure 46 which is provided or formed within the lower end portion 20 of the tailgate 18 as seen in FIGS. 3–6 as well as FIGS. 9–10. The recessed handle 46 is symmetrically formed about a vertically extending centerline 48, as seen in FIG. 6, such that a single person 50 can readily carry or transport the tailgate 18 in a balanced manner, the central location of the handle 46 being considered with respect to the opposite left and right sides of the tailgate 18. As can be best appreciated from FIG. 10, the tailgate 18 comprises an inside panel 52, and outside panel 54, and a bottom panel 56. The recessed handle 46 is effectively formed at the corner junction defined between the inside panel 52 and the bottom panel 56 with the upper edge portion 58 of the recessed handle 46, which leads into the recessed space 60 for accommodating the person's fingertips, being rounded so as not to present any sharp edges or corners to the person's fingers. The lower region of the inner panel 52, within the vicinity of the recessed handle 46, is also smoothly curved so as not to present any sharp edge regions to the person's palm or upper finger portions. In this manner, as can be particularly appreciated from FIG. 6, the person 50 can comfortably grasp and carry the tailgate 18 by means of both the palm and fingertip regions of the person's hand without undue fatiguing loads acting upon or effectively cutting into the person's hand. It is also noted, as can best be appreciated from FIGS. 6 and 9, that the recessed handle 46 has a predetermined width dimension as defined by means of opposite end or sidewalls 62. The width dimension is predeterminedly sized so as to comfortably accommodate the four fingers of the person's hand, other than the thumb, and yet provide opposite end or side walls which can engage the index finger or the pinkie finger of the person so as to facilitate the balancing of the tailgate 18 while the same is being carried or transported. In other words, should the tailgate 18 suddenly assume an unbalanced position with respect to the person 50, that is, should the tailgate 18 suddenly, for one reason or another, become tilted downwardly or upwardly either at its front end or at its rear end, as viewed in the direction in which the person 50 is walking while carrying the tailgate, the structure of the recessed handle 46 which accommodates, yet comfortably confines, the person's fingers will assist the person is regaining the required and desired balance of the tailgate 18.

It is noted, by reference being made again to FIG. 2, that when the tailgate 18 is disposed at its vertical closed position, the recessed handle structure 46 is not visible in view of the fact that the handle 46 is defined within the lower end portion 20 of the tailgate 18 so as to be disposed just below the level of the truck bed 24. However, as can be seen from FIGS. 3–5, when the tailgate 18 is pivoted to the angular position with respect to the side panels 14 and 16, or with respect to the bed 24, at which position the tailgate 18 is able to be removed from the truck vehicle 10, the handle 46 is not only visible but accessible to the person 50 so as to be grasped by the person 50 and removed from the vehicle 10 so as to be carried, for example, to a storage location as seen in FIG. 6. It is lastly noted that in connection with the recessed handle structure 46 per se, and in order to further facilitate the grasping and holding of the tailgate assembly 18 by means of the recessed handle structure 46, the grasping or gripping surfaces of the recessed handle structure 46 may be coated or provided with a suitable anti-slipping means. For example, the interior surfaces of the recessed handle structure 46 may be knurled or otherwise finely roughened so as to enhance the gripping or grasping thereof particularly when the person 50 may be wearing a suitable pair of work gloves, or the like, not shown.

Figure 11:
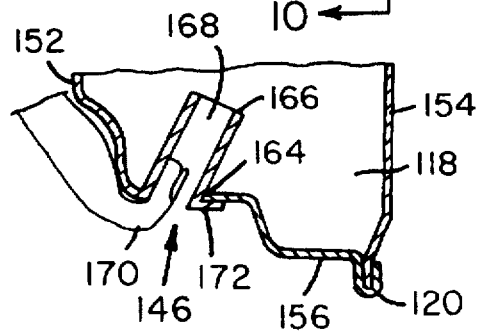
FIG. 11 is a cross-sectional view of a second embodiment of a tailgate assembly having a recessed handle portion formed or incorporated therein.

With reference lastly being made to FIG. 11, a second embodiment of the recessed handle structure formed in accordance with the principles of the present invention is illustrated and generally indicated by the reference character 146. It is to be noted that like reference characters designate like or corresponding parts within the embodiments of, for example, FIGS. 10 and 11, with the exception that the structural components of the embodiment of FIG. 11 are denoted by reference characters in the 100 series. Accordingly, the tailgate assembly is generally indicated by the reference character 118, and the lower end portion thereof is denoted by the reference character 120. In lieu of the bottom panel 156 of the tailgate assembly 118 being simply provided with a recessed handle as illustrated at 46 in the embodiment of FIG. 10, the bottom panel 156 of the embodiment of FIG. 11 is provided with an aperture 164, and an insert 166, which is in the form of an elongated, substantially oval-shaped tube, is snap-fitted or otherwise fixedly secured within the aperture 164. The tubular insert 166 defines an interior hollow space 168 for accommodating the person's fingertips as shown at 170, and the insert 166 may be fabricated from a suitable plastic material. The insert 166 further comprises an external flange portion 172 for facilitating proper mounting of the insert 166 within the aperture 164 of the bottom panel 156 of the tailgate assembly 118, and it is noted that the portion of the flange 172 which mates within the inner panel 152 of the tailgate 118 is some-what rounded so as to smoothly merge with the contours of the inner panel 152 and thereby eliminate any sharp edge or corner regions which would otherwise be presented to and engage the person's palm and fingers. As in the case of the recessed embodiment of FIG. 10, the aperture 164 and the tubular insert 166 disposed therein have predetermined width dimensions so as to accommodate the four fingers of the person 50 in a laterally confined but comfortable manner such that the person 50 can carry or transport the tailgate assembly 118 in a balanced and controlled manner.

Industrial Applicability

In light of the foregoing, it is seen that in accordance with the teachings of the present invention, handle means has been provided within the vicinity of the lower end portion of a removable tailgate assembly of, for example, a pick-up type truck vehicle, so as to facilitate the handling, carrying, and transportation of the tailgate assembly once the same has been removed from the vehicle. The handle means is provided within a central region of the tailgate assembly, as considered in the transverse, widthwise direction extending between opposite lateral sides of the tailgate assembly so as to enable a single person to carry or transport the tailgate assembly in a balanced mode. The handle means may comprise a recessed handle formed at the corner junction of the tailgate inner and bottom panel members, or alternatively, may comprise a hollow insert mounted within an aperture provided within the vicinity of the corner junction of the tailgate inner and bottom panel members. The handle means is thus not readily visible or accessible when the tailgate assembly is disposed in its vertical, closed position, but is visible and accessible when the tailgate assembly is pivotally moved to its angular position at which the tailgate assembly can be removed from the vehicle. The tailgate assembly is thus readily available to be grasped, removed, and transported away from the vehicle by means of a single person.

Obviously, many modifications and variations of the present invention are possible in light of the above teachings. It is therefore to be understood that within the scope of the appended claims, the present invention may be practiced otherwise than as specifically described herein.

What is claimed is:

1. A tailgate assembly for a pick-up type truck vehicle, comprising:

a tailgate assembly comprising an inner panel, an outer panel, and a bottom panel interconnecting said inner and outer panels;

means provided upon opposite lateral sides of said tailgate assembly within the vicinity of said bottom panel for defining a pivot axis about which said tailgate assembly is pivotable between a vertical closed position and a horizontal open position, and for cooperating with corresponding means provided upon said truck vehicle by which said tailgate assembly may be installed upon said truck vehicle and removed from said truck vehicle when said means of said tailgate assembly is releasably engaged with and disengaged from said corresponding means of said truck vehicle, respectively, as a result of said tailgate assembly being pivotally disposed at a predetermined angular position, between said vertical closed and horizontal open positions, with respect to said truck vehicle; and handle means defined within the vicinity of said bottom panel of said tailgate assembly and along a centerline thereof intermediate said opposite lateral sides of said tailgate assembly for permitting a person to grasp said tailgate, remove said tailgate from said truck vehicle when said tailgate assembly is disposed at said predetermined angular position with respect to said truck vehicle, and to carry said tailgate assembly away from said truck vehicle in a balanced mode.

2. A tailgate assembly as set forth in claim 1, wherein:

said handle means is provided at a corner junction defined between said inner panel of said tailgate assembly and said bottom panel of said tailgate assembly.

3. A tailgate assembly as set forth in claim 2, wherein:

said handle means comprises a recessed region formed within said tailgate assembly.

4. A tailgate assembly as set forth in claim 3, wherein:

a lower end portion of said inner panel of said tailgate assembly which leads into said recessed region, as well as an upper edge portion of said recessed region defining an entrance portion for a person's fingers into said recessed region, are smoothly contoured and rounded so as to provide support surfaces for said person's palm and finger regions of said person's hand which will enable said person to carry said tailgate assembly without experiencing fatiguing loads which would otherwise be generated by sharp-edged portions of said tailgate assembly acting upon said palm and finger regions of said person's hand.

5. A tailgate assembly as set forth in claim 3, wherein:

said recessed region comprising said handle means has a predetermined lateral width dimension which accommodates, yet comfortably confines, four fingers of said person's hand so as to assist in balancing said tailgate assembly.

6. A tailgate assembly as set forth in claim 2, wherein:

said corner junction of said tailgate assembly is provided with an aperture; and said handle means comprises a tubular insert disposed within said aperture of said tailgate assembly for accommodating fingertip portions of said person's hand.

7. A tailgate assembly as set forth in claim 6, wherein:

a lower end portion of said inner panel of said tailgate assembly which leads to said tubular insert, as well as a flange portion of said tubular insert defining an entrance portion for said person's fingertip portions into said tubular insert, are smoothly contoured and rounded so as to provide support surfaces for said person's palm and finger regions of said person's hand which will enable said person to carry said tailgate assembly without experiencing fatiguing loads which would otherwise be generated by sharp-edged portions of said tailgate assembly acting upon said palm and finger regions of said person's hand.

8. A tailgate assembly as set forth in claim 6, wherein:

said tubular insert comprising said handle means has a configuration which has a predetermined lateral width dimension which accommodates, yet comfortably confines, four fingers of said person's hand so as to assist in balancing said tailgate assembly.

9. A tailgate assembly as set forth in claim 1, wherein:

said handle means is provided upon a lower end portion of said tailgate assembly so as to be invisible and inaccessible by said person when said tailgate assembly is disposed at said vertical closed position, but is visible and accessible to said person when said tailgate assembly is disposed at said predetermined angular position with respect to said truck vehicle.

10. A tailgate assembly as set forth in claim 9, wherein:

said predetermined angular position comprises an angle of approximately 45°.

11. In combination, a tailgate assembly and a pick-up truck vehicle, comprising:

a pick-up truck vehicle comprising a bed, a left side panel, and a right side panel;

a tailgate assembly comprising an inner panel, an outer panel, and a bottom panel interconnecting said inner and outer panels;

means provided upon said left and right side panels of said truck vehicle for defining a pivot axis for said tailgate assembly about which said tailgate assembly may be pivotally moved between a vertical closed position and a horizontal open position;

means provided upon opposite lateral sides of said tailgate assembly within the vicinity of said bottom panel of said tailgate assembly for cooperating with said pivot axis means of said truck vehicle by which said tailgate assembly may be installed upon said truck vehicle and removed from said truck vehicle when said means of said tailgate assembly is releasably engaged with and disengaged from said pivot axis means of said truck vehicle, respectively, as a result of said tailgate assembly being pivotally disposed at a predetermined angular position, between said vertical closed and horizontal open positions, with respect to said truck vehicle; and handle means defined within the vicinity of said bottom panel of said tailgate assembly and along a centerline thereof intermediate said opposite lateral sides of said tailgate assembly for permitting a person to grasp said tailgate, remove said tailgate from said truck vehicle when said tailgate assembly is disposed at said predetermined angular position with respect to said truck vehicle, and to carry said tailgate assembly away from said truck vehicle in a balanced mode.

12. The combination as set forth in claim 11, wherein:

said handle means is provided at a corner junction defined between said inner panel of said tailgate assembly and said bottom panel of said tailgate assembly.

13. The combination as set forth in claim 12, wherein:

said handle means comprises a recessed region formed within said tailgate assembly.

14. The combination as set forth in claim 13, wherein:

a lower end portion of said inner panel of said tailgate assembly which leads into said recessed region, as well as an upper edge portion of said recessed region defining an entrance portion for a person's fingers into said recessed region, are smoothly contoured and rounded so as to provide support surfaces for said person's palm and finger regions of said person's hand which will enable said person to carry said tailgate assembly without experiencing fatiguing loads which would otherwise be generated by sharp-edged portions of said tailgate assembly acting upon said palm and finger regions of said person's hand.

15. The combination as set forth in claim 13, wherein:

said recessed region comprising said handle means has a predetermined lateral width dimension which accommodates, yet comfortably confines, four fingers of said person's hand so as to assist in balancing said tailgate assembly.

16. The combination as set forth in claim 12, wherein:

said corner junction of said tailgate assembly is provided with an aperture; and said handle means comprises a tubular insert disposed within said aperture of said tailgate assembly for accommodating fingertip portions of said person's hand.

17. The combination as set forth in claim 16, wherein:

a lower end portion of said inner panel of said tailgate assembly which leads to said tubular insert, as well as a flange portion of said tubular insert defining an entrance portion for said person's fingertip portions into said tubular insert, are smoothly contoured and rounded so as to provide support surfaces for said person's palm and finger regions of said person's hand which will enable said person to carry said tailgate assembly without experiencing fatiguing loads which would otherwise be generated by sharp-edged portions of said tailgate assembly acting upon said palm and finger regions of said person's hand.

18. The combination as set forth in claim 16, wherein:

said tubular insert comprising said handle means has a configuration which has a predetermined lateral width dimension which accommodates, yet comfortably confines, four fingers of said person's hand so as to assist in balancing said tailgate assembly.

19. The combination as set forth in claim 11, wherein:

said handle means is provided upon a lower end portion of said tailgate assembly so as to be invisible and inaccessible by said person when said tailgate assembly is disposed at said vertical closed position as a result of said lower end portion of said tailgate assembly being disposed at an elevational level immediately below said bed of said truck vehicle, but is visible and accessible to said person when said tailgate assembly is disposed at said predetermined angular position with respect to said truck vehicle.

20. The combination as set forth in claim 19, wherein:

said predetermined angular position comprises an angle of approximately 45°.

* * * * *